United States Patent
Bleckner et al.

(10) Patent No.: US 8,341,146 B1
(45) Date of Patent: Dec. 25, 2012

(54) SEARCH HISTORY PRESENTATIONS

(75) Inventors: Colin D. Bleckner, Menlo Park, CA (US); Colin M. Saunders, Menlo Park, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 13/089,057

(22) Filed: Apr. 18, 2011

Related U.S. Application Data

(63) Continuation of application No. 11/366,229, filed on Mar. 2, 2006, now Pat. No. 7,953,730.

(51) Int. Cl.
*G06F 7/00* (2006.01)
*G06F 17/30* (2006.01)
*G06F 15/16* (2006.01)

(52) U.S. Cl. ........................................ 707/722; 707/767

(58) Field of Classification Search ................ 707/722, 707/767
See application file for complete search history.

(56) References Cited

U.S. PATENT DOCUMENTS

| | | | |
|---|---|---|---|
| 6,363,377 B1* | 3/2002 | Kravets et al. | 707/4 |
| 6,460,029 B1* | 10/2002 | Fries et al. | 707/3 |
| 6,760,720 B1* | 7/2004 | De Bellis | 707/722 |
| 7,680,856 B2* | 3/2010 | Qureshi | 707/722 |
| 7,734,622 B1* | 6/2010 | Fitzhugh | 707/722 |
| 7,747,614 B2* | 6/2010 | Freeman et al. | 707/722 |
| 7,925,649 B2* | 4/2011 | Jeh et al. | 707/722 |
| 7,945,637 B2* | 5/2011 | Van Vleet et al. | 707/722 |
| 2003/0018634 A1* | 1/2003 | Shringeri et al. | 707/4 |
| 2004/0267700 A1* | 12/2004 | Dumais et al. | 707/2 |
| 2006/0069998 A1* | 3/2006 | Artman et al. | 715/721 |
| 2006/0248061 A1* | 11/2006 | Kulakow et al. | 707/3 |
| 2008/0077558 A1* | 3/2008 | Lawrence et al. | 707/3 |

* cited by examiner

*Primary Examiner* — Greta Robinson
*Assistant Examiner* — Brian E. Weinrich
(74) *Attorney, Agent, or Firm* — Novak Druce + Quigg LLP

(57) ABSTRACT

A method for displaying a search history for a user is shown. The method includes generating a search history for a user including one or more listings of search results, displaying a first search result listing on a web page, and displaying at least a second search result listing on the web page, the second search result listing having a relationship to the first search result listing within the search history.

13 Claims, 9 Drawing Sheets

SEARCH HISTORY PRESENTATIONS

CROSS-REFERENCES TO RELATED APPLICATIONS

This application is a continuation of U.S. application Ser. No. 11/366,229 (U.S. Pat. No. 7,953,730), filed on Mar. 2, 2006, titled "System and Method for Presenting a Search History," of which the full disclosure of this application is incorporated herein by reference for all purposes.

BACKGROUND

An increasing number of users seeking information utilize web browsers connected to the Internet to begin searching for that information. Users typically begin their search for information by pointing their web browser at a website associated with a search engine. A search engine is a program designed to help locate information. The search engine may be configured to search any of a variety of systems of varying size and scope. For example, the search engine may be configured to search multiple computer systems such as computers publishing information on the World Wide Web, to search within a particular website on the World Wide Web, to search it personal computer, or to search any other system. The search engine allows the user to request web pages containing information related to a particular search term or phrase.

Although search terms and phrases may be used by the search engine to guide the information search, finding the particular information being sought by the user is challenging. New information is constantly becoming available via the World Wide Web. As the amount of information that is available, increases, the difficulty that users experience in finding particular information of interest also increases.

In response to the growing difficulty users face in finding information, many search engines offer search engine features, such as a search history, to assist the user in performing their search. In existing systems, a search history may be a listing of previous searches. The search history may also include information associated with each search such as the date the search was performed. The search history is presented to the user in a list, generally sorted by the date. The user can see what searches have already been performed.

However, the usefulness of the search history is limited by the listing presentation. For example, a user wanting to revisit an earlier search in performing a new search for information about a particular make and model of vehicle would not intuitively search through a listing of their previous searches sorted by date. Further, the search history generally does not include sufficient additional information related to the searches that were performed to provide advanced guidance to the user.

What is needed is a system and method for providing an intuitive, navigable user search history to a user. What is further needed is such a system and method configured to provide guidance to the user in performing future searches. What is yet further need is such a system and method configured to provide the user with detailed' information about their search history. It will be appreciated that while the teachings herein describe certain features and advantages that may be achieved, the teachings-herein may be used to implement systems and methods that do not necessarily achieve any of these features or advantages, but rather achieve other features and advantages.

DETAILED DESCRIPTION

Figure 1:
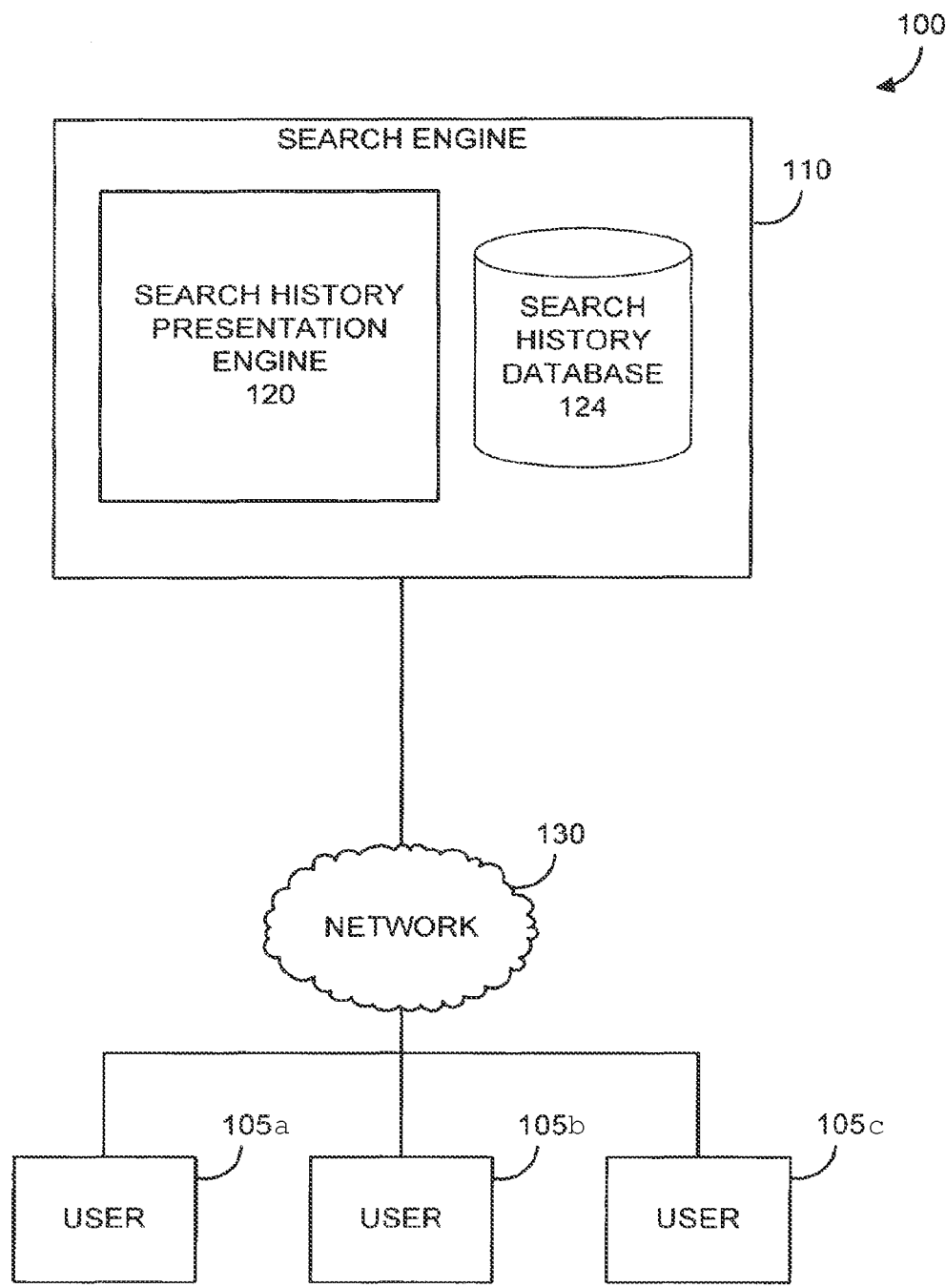
FIG. 1 is a web site system including a search engine, a search history presentation web site, a communication network, and a plurality of users, according to an exemplary embodiment.

One embodiment relates to a method for displaying a search history for a user is shown. The method includes generating a search history for a user including one or more listings of search results, displaying a first search result listing on a web page, and displaying at least a second search result listing on the web page, the second search result listing having a relationship to the first search result listing within the search history.

Another embodiment relates to a search history presentation system configured to display and allow navigation of a search history of a user. The system includes a search history presentation engine configured to generate the search history for the user. The search history includes one or more listings of search results. The system further includes a search history database configured to store the search history for the user and a search history navigation interface configured to display a plurality of search nodes representative of searches performed by the user using a search engine, wherein each search node includes search terms entered by the user.

Yet another embodiment, relates to a search engine system configured to display a listing of search results further configured to display and allow navigation of a search history of a user using the search engine. The system includes a search engine configured to receive one or more search terms and generate a listing of search results. The system further includes a search history presentation engine configured to generate the search history for the user based on searches performed by the search engine and to generate a search history presentation web page. The web page may be configured to display the first listing of search results and at least a second listing of search results, the second listing of search results having a relationship to the first listing of search results within the search history.

Yet another embodiment relates to a computer memory configured to cause a computer processor to provide a graphical user interface to a user search history. The graphical user interface includes a search history browser configured to display one or more search nodes within a search history space, the search nodes including search terms and a listing of search results generated by a search engine based on the search term. The search history browser includes a timeline navigation interface configured to allow a user to navigate along a search history timeline including a subset of the plurality of search nodes, a search history selection interface configured to allow a user to navigate between search history categories, and a zoom level interface configured to allow the user to display more or less of the search history space within the search history browser.

Yet another embodiment relates to a method for displaying a search history for a user. The method includes providing a display having a plurality of search result listing positions, where each search result listing position configured to display a search result listing. The method further includes populating the search result listing positions with search result listings from a search history timeline, and shifting the search result listings within the search result positions based on updates to the search-history timeline. The search result listings are shifted such that the search result listings cycle through the search result listing positions as new search result listings are received.

Referring to FIG. 1, a web site system 100 including a search engine 110 including a search history presentation engine 120, a communication network 130, and a plurality of users 105*a-c* is shown, according to an exemplary embodiment. Search history presentation engine 120 includes a search history database 124 configured to store information pertaining to searching behavior for the plurality of users 105.

Web site system 100, search engine 110, and search history presentation engine 120 may be implemented as computing systems or computer programs to be executed using a computer system. The web site system 100, search engine 110, search history presentation engine 120, and associated components of each system may be implemented using a single computing system (e.g., comprising one or more servers) or separate computer systems configured to communicate through a communication channel, such as a direct connection or communication network 130. For example, the search history presentation engine 120 may be implemented separately from the search engine 110.

Search engine 110 maybe any type of search engine configured to receive one or more keywords or search queries, hereinafter referred to as search terms, and generate a listing of search results. Search engine 110 may be configured to retrieve data, files, or documents from a database or network, such as the Internet, based on the search terms entered by a user 105 or other user of a search engine website. The listing of search results may be a listing of web pages or web sites offering information or functionality associated with the search terms that were entered by the user. The listing of search results may be displayed on a single or multiple web pages. For example, a first web page may display the first twenty results, a second page may display the second twenty results, etc.

According to an alternative embodiment, search engine 110 maybe associated with an online seller of products such as goods or services and search engine 110 may be a product search engine which may be used to search for products within a web site associated with search engine 110. Search engine 110 may be configured to display products associated with search terms entered by a user 105 and also offered for sale through the web site associated with search engine 110 or another site. Although two exemplary embodiments are provided, it should be understood that search engine 110 may be associated with any information repository, such as an article repository associated with a newspaper or other content provider.

Search engine 110 maybe configured to build a search results history for each user 105 using search engine 110 to perform searches. The search results history that is generated by search engine 110 may range from simplistic to very detailed. For example, a simplistic search results history may include simple search history information such as the search terms that were entered and the date and time that the search terms were entered. Detailed search history information may include any other available or determinable information including, but not limited to, the search result listing that was generated, a record of the search results that were actually clicked on by the user, the amount of time spent viewing the search result listing, an indication of user 105 returning to search engine 110 from a web site associated with a search result, a record of refinements to the search terms entered by a user 105 after an initial search result listing is displayed, etc. Search engine 110 may be implemented using a server architecture for capturing, persistently storing, and serving event data that occur during the browsing sessions of web site users, for example, in accordance with the teachings of U.S. Patent Application No. 20050033803, entitled "Server Architecture and Methods for Persistently Storing and Serving Event Data," hereby incorporated by reference. More of the detailed information that may be used and methods for using the information are discussed in further detail below with reference to FIGS. 2-5.

Search engine 110 may store the search results history in one or more different data structures, depending on the type and intended use of the information. For example, where search engine 110 is compiling a simple search history, search engine 110 may be configured to store the information in a timeline data structure, described in further detail below with reference to FIG. 2B. However, where the type of information of information is more complex, search engine 110 may be configured to store the information in one or more search category groupings, further discussed below with reference to FIG. 4. Search engine 110 may further be configured to store rich information in the data structure and provide an interface to allow the user to access the information in a variety of different ways. For example, the user can search on the data, search the history based on text, text in URLs, text in search results, date performed, etc.

According to an exemplary embodiment, search engine 110 and the stored search history information may be configured such that the search behavior of a user 105 can be captured independent of the particular computing system being used. For example, search 110 may be configured to generate a single search history for a user independent of whether the user is searching from a work, home, and/or public computing system and independent from the particular type of search engine being accessed by the user 105.

Search history presentation engine 120 may be any computing system configured to present the search history information from search engine 110 in a convenient, navigable search history timeline on one or more web pages, described in detail below with reference to FIGS. 2-5. Search history presentation engine 120 is coupled to search history database 124 configured to store and retrieve the search history for each user 105*a-c*.

Search history presentation engine 120 may be further configured to receive information related to a user search history from sources other than search engine 110. For example, a computing system for a user 105 may contain information indicative of the user's searching behavior using other search engines. The user 105 can choose to share this information with engine 120 to optimize their search history presentation. Other information may be received from, for example, third party search engines, commercial web sites, the user 105, etc.

Figure 2A:
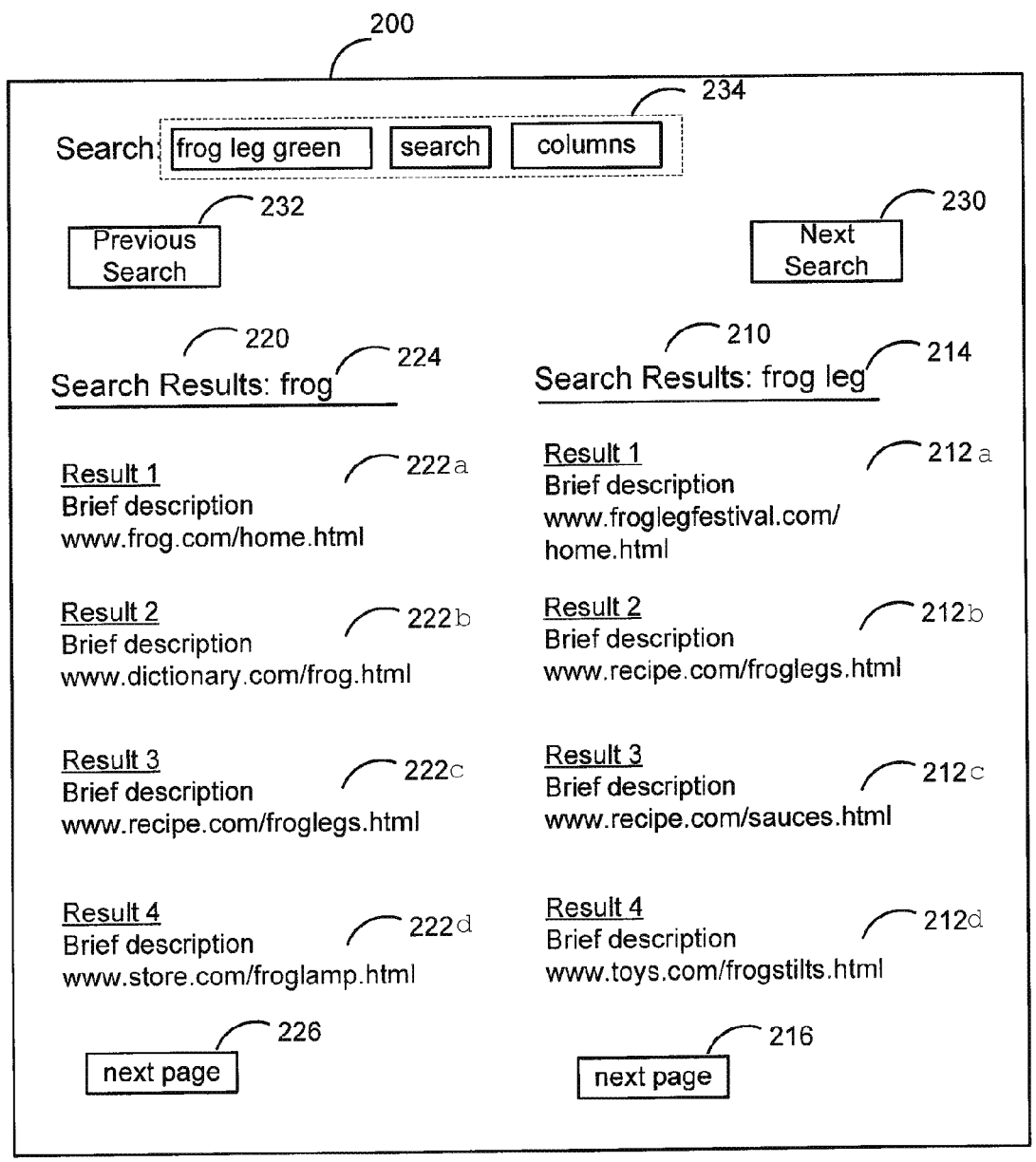
FIG. 2A is a search history timeline web page including a first search result listing and at least one past search result listing, according to an exemplary embodiment.

Referring now to FIGS. 2A, 2B, 2C, 3A, 3B, 3C, and 4, the manner in which search history presentation engine 120 displays a user search history in a web page in an intuitive, navigable format is described in greater detail, according to various exemplary embodiments. Referring first to FIG. 2A, a search history timeline web page 200 including a first search result listing 210 and at least one second search result listing 220 is shown, according to an exemplary embodiment. According to an exemplary embodiment, first search result listing 210 may be a listing of search results for present search terms that were searched by a user 105 and past search result listing 220 may be a listing of search results for previous search terms that were searched by the user 105 immediately prior to searching the present search terms, described in further detail below.

In FIG. 2A, a search history presentation web page 200 is configured to display search results data from search engine 110 in first search result listing 210, according to an exemplary embodiment. When search engine 110 is provided with one or more search terms from a user, the results of the search may be provided by search engine 110 in the form of data, such as data for a search results web page. The data for a search results web page may include a listing of content-based web pages associated with the search term displayed.

In the illustrated example, search engine 110 has executed a search for the search term "frog leg." The generated search results are displayed in first search result listing 210. First search result listing 210 includes hyperlinks 212a-d to content-based web pages regarding, for example, products associated with the search term "frog leg." The search term that was used may be displayed in a search term title field 214. In this embodiment, search result listing 210 lists web pages providing detailed information about the search term or various individual products for sale related to the search term. A subset of the total number of search results are displayed in listing 210 along with a button 216 to allow the next set of search results to be accessed.

Further in the illustrated example, search engine 110 previously executed a search for the search term "frog." The search results for the previous search are also displayed on web page 200 in second search result listing 220. Similar to first search result listing 210, listing 220 includes hyperlinks 222a-d to content-based web pages associated with the previously entered search term "frog" and includes a next button 226 to allow user 105a-c to view additional search results. The previous search terms that were used may be displayed in a past search term title field 224.

According to an exemplary embodiment, first search result listing 210 has a relationship with the second search result listing 220 within the search history of user 105. The relationship may be based on timing, e.g., as shown in FIG. 2A, the search terms used to generate first search result listing 210 may have been entered by user 105 immediately following entry of the search terms used to generate second search result listing 220. The relationship with the search history for user 105 may alternatively be based on subject matter, a user-defined category, or any other criteria. The relationship between searches may be stored within database 124.

Although search result listings 210 and 220 are described as being search result listings for consecutively entered search terms, it should be understood that they may be any related search listings. For example, first search result listing 210 may be replaced by a search result listing for search terms entered by a user 105 one week ago and second search result listing 220 may be replaced by search results from two weeks ago in the same subject matter. The search terms may be related based on the identity of the user 105, subject matter, timing, refinements that were entered, and/or any other criteria.

Web page 200 may be configured to allow a user 105 to select one or more of the hyperlinks 212a-d and/or hyperlinks 222a-d in the search result listings to display a web page associated with the particular hyperlink that was selected. Alternatively, web page 200 may be configured such that user 105 can only select hyperlinks associated with first search result listing 210.

Web page 200 may further be configured to update first search result listing 210 and second search result listing 220 upon receipt of a new set of result results, i.e., where a user 105 has entered new search terms. Web page 200 may be configured to display the new search result listing as first search result listing 210 and move the former first search result listing to be displayed as second search result listing 220. Depending on the display options selected by user 105, discussed in further detail below, the former second search result listing may be removed from web page 200. These updates may be performed' without requiring a page update, such that the user 105 can see the search history being compiled. The updates may further be implemented using one or more techniques, such as showing the movement of first search result listing 210 over to the position on web page 200 formerly occupied by second search result listing 220, to illustrate the relationship between the searches.

Figure 2B:
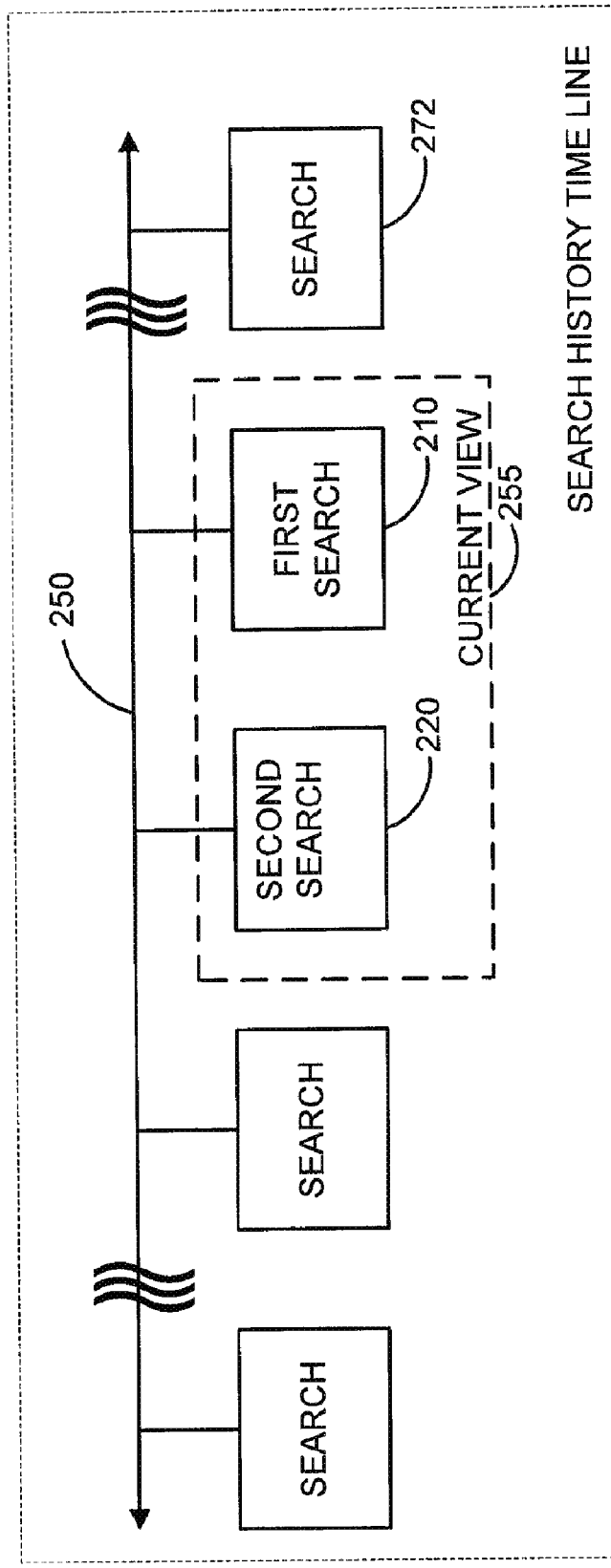
FIG. 2B is a timeline representative of a search history for a user, according to an exemplary embodiment.

Referring now to FIG. 2B, a graphical representation of a timeline data structure 250 displaying a search history for a user 105 is shown, according to an exemplary embodiment. The graphical representation is shown for illustrative purposes, but may also be displayed on a web page, described in further detail below. According to the illustrated embodiment, timeline data structure 250 is representative of a search history for the user 105 of FIG. 2A. Timeline data structure 250 includes first search result listing 210 from FIG. 2A at a first data location and second search result listing 220 from FIG. 2A at a second, adjacent location on timeline 250. A timeline data structure may be a data structure stored in database 124.

Timeline 250 includes a "current view" indication 255 illustrating the position of first search result listing 210 and second search result listing 220, shown on web page 200, along timeline 250. As shown, timeline 250 may include a large number of search result listings that are generated based on the behavior of a particular user 105 associated with timeline 250.

Timeline 250 maybe generated and continuously updated by search history presentation engine 120 based on the behavior of user 105 using search engine 110. For example, the information stored in database 124 for user 105 may be modified every time the user 105 performs a new search, every time the underlying search results change, etc. Search history presentation engine 120 may be configured to generate one or more timeline's 250 based on information for each user 105 stored in database 124. Search history presentation engine 120 may further be configured to store and retrieve timeline 250 from database 124.

According to an alternative embodiment, a user 105 may generate multiple timelines 250. Each timeline 250 may be associated with one or more particular subcategories of user behavior. For example, a user 105 may create a "shopping" research timeline 250, an "ancient Rome" research timeline 250, etc. The multiple timelines may be generated based on a user designation of the particular category being searched or may be automatically generated by search history presentation engine 120. Search history presentation engine 120 may be configured to automatically generate the categories based on search term groupings, user behavior, user group behavior, etc. For example, where user 105 enters a first search term "ancient Rome," and a second term "gladiator", these terms may be grouped together in a timeline 250 based on a computer-implemented rule within presentation engine 120 linking gladiators with ancient Rome.

Referring again to FIG. 2A, web page 200 may be configured to allow user 105 to navigate timeline 250 to change the search result listings that are displayed. For example, web page 200 may include a search history navigation interface including a search history forward button 230 and a search history backward button 232 to allow a user 105 to display search results that were entered earlier or later in time by user 105. Accordingly, user 105 may move forward and backward along timeline 250. Web page 200 may further include a column button 234 configured to allow user 105 to customize the number of columns, i.e. the number of search result listings, that are displayed on web page 200 at any particular time.

According to an exemplary embodiment, search engine 110 maybe configured to display web page 200 to user 105 during normal searching operations. According to alternative embodiments, web page 200 may be displayed to a user based on any other type of action performed by the user. For example, a user 105 may access web page 200 by clicking on a "Search History" hyperlink displayed on a web page for search engine 110.

Figure 2C:
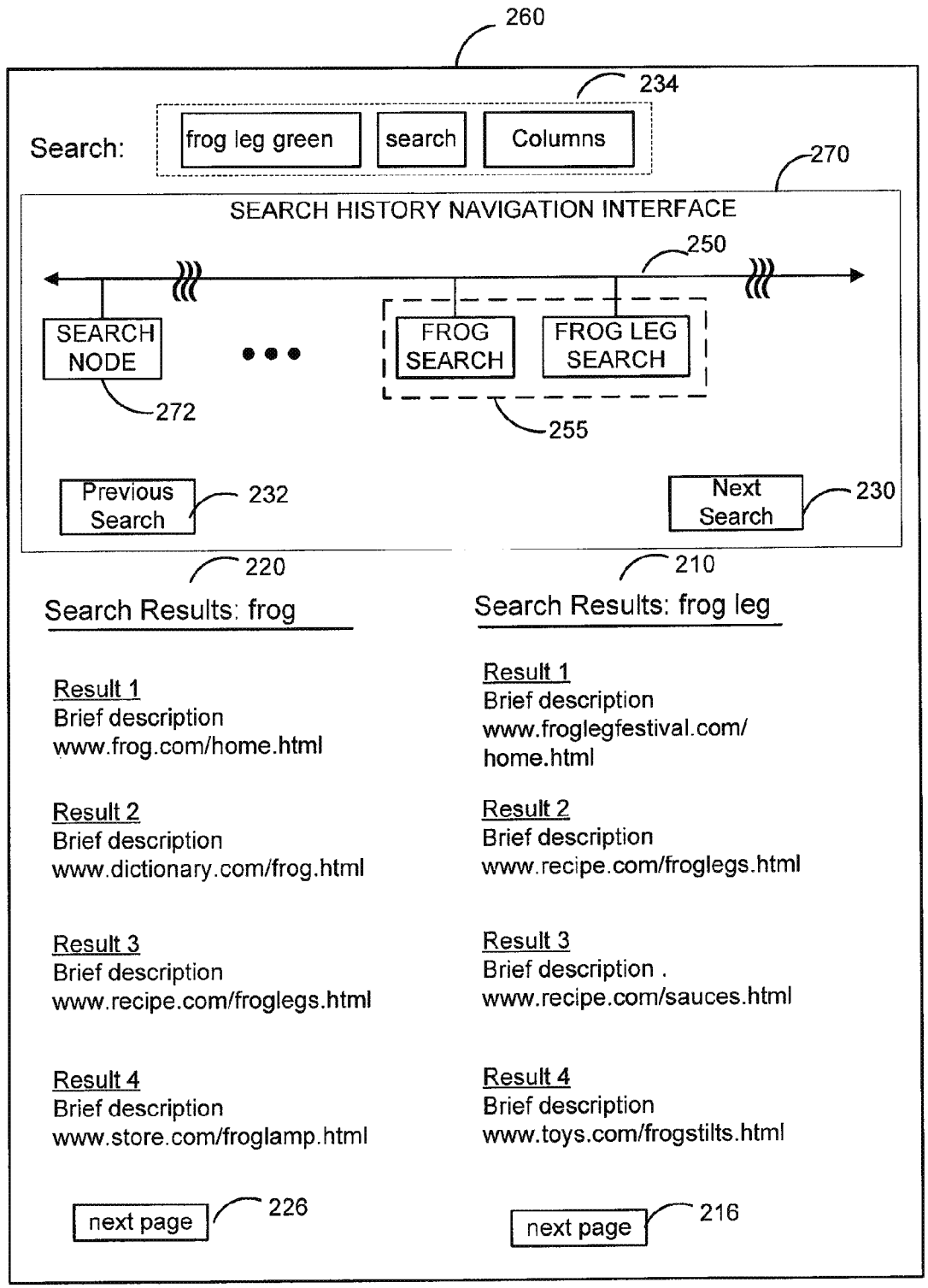
FIG. 2C is a web page including first and second search result listings where at least a portion of an abbreviated search history timeline is shown in an abbreviated format on a web page, according to an exemplary embodiment.

According to an exemplary embodiment, the graphical representation of timeline 250 may be displayed to user 105 in a search history navigation interface on a web page including the search results listings. Referring now to FIG. 2C, a web page 260 including first and second search result listings 210 and 220 is shown, where at least a portion of search history timeline 250 from FIG. 2B is shown in an abbreviated format in a search history navigation interface 270, according to an exemplary embodiment.

Search history navigation interface 270 is a navigable interface configured to display all or a portion of timeline 250. Where only a portion of timeline 250 is shown, navigation interface 270 may include scroll bars and/or navigation keys that can be manipulated by user 105 to navigate timeline 250. A plurality of search nodes 272 may also be displayed with timeline 250. Each search node 272 is a graphical representation of a search performed by user 105 using search engine 110. Each search node 272 may be configured to display information associated with a particular search such as the search terms, the listing search results, actions taken by user 105 in selecting specific search results from the listing of search results, etc. in the abbreviated format.

An abbreviated format may include any subset of the complete information associated with each search result listing. For example, a first abbreviated format may include the search terms used to generate the search result listing, a second may include the search terms and a first five search results, a third may include the titles of the web pages associated with each search result, a fourth may include thumbnails of the web pages themselves, a fifth may include screenshots, a sixth format may be provided according to a categorization, such as search terms used to generate the result, etc. The abbreviated format may be selected to facilitate navigation of timeline 250, presenting as much information as possible while maintaining readability (e.g., a thumbnail view). The abbreviated format may further be customizable by the user 105 based on their particular tastes and needs.

Search history navigation interface 270 may be configured to display the "current view" indication 255 described above with reference to FIG. 2B. Indication 255 may be a box enclosing the search results currently being displayed in first search result listing 210 and second search results listing 220. Search history navigation interface 270 may be configured such that indication 255 may be manipulated by the user. For example, a user 105 may select indication 255 and "drag" it along timeline 250 to change the search results displayed as first search result listing 210 and second search result's listing 220. Further, interface 270 may be configured such that user may click on a edge of indication 255 and drag it sideway to increase the size of indication 255 to enclose additional search node 272 and change the number of search result listings being display on web page 260.

Search history navigation interface 270 may be implemented using an embedded application configured to dynamically update the information displayed on interface 270. For example, the information may be updated based on the activity of user 105. Based on entry of new search terms by user 105, interface 270 may be configured to automatically display a new search node 272 on timeline 250 and reposition the current view indication 255 to enclose the new search node. According to another example, where user 105 selects a search result associated with search results for a search node 272, the search node 272 may be updated to indicate that the user selected a search result, possibly increasing the relevance of the search results, the time spent on the search results, etc. Search history navigation interface 270 may be automatically modified to reflect this activity. Navigation interface 270 may be implemented such that changes to the information displayed on navigation interface 270 may be displayed without reloading web page 260.

Navigation interface 270 may include a plurality of hyperlinks configured to allow user 105 to easily navigate through their search history. For example, a user may click on any search result listing to display that search result listing as the first search result listing 210. Alternatively, history timeline 430 maybe configured such that user 105 may select a particular search results within any of the search result listings in timeline 250. Where the node 272 is configured to display some portion of the listing of search results for the search associated with the node, interface 270 may also be configured such that the user may select particular search results from within navigation interface 270.

Although FIGS. 2A-2C are discussed in the context of search engine 110, it will be appreciated that a search engine for a product listing may also be configured to communicate search terms that were used to generate search results and an indication of the search result that was selected based on the entry of the search term by user 105. For example, if a user performs a search for a product from a product search engine, and lands directly on a web page associated with that product, the search terms that caused the user to land on that page may be communicated by the search engine 110 to the search history presentation engine 120. This information may be used alone or in combination with the information from search engine 110.

Although the search history of a user 105 is illustrated above with reference to a timeline 250, it should be understood that a search history may be generated and maintained by search history presentation engine 120 in any number of different ways depending on the information available to search history presentation engine 120. Further, although web page 260 is configured to display a timeline representative of the search history for a user 105 on a portion of a web page 260, it should be understood that any alternative graphical representation of a search history may be also displayed in a variety of different ways. For example, a search history may be displayed in a dedicated search history navigation interface web page that does not include listings of search results, further described below with reference to FIGS. 3C and 4.

A search history of a user 105 may be generated and maintained in a decision tree data structure, where a selection from alternative suggested revisions to the current search, made by the user 105, creates a branch in the tree data structure. For example, referring now to FIG. 3A, a web page 300 illustrating a first search result listing 310 for the search term "frog legs" and a second search result listing 320 for the search term "frog" including a search revision selection display 325 is shown, according to an exemplary embodiment. A search decision display 325 displays one or more suggested search revisions related to the first search result listing and displayed on web page 300.

Figure 3A:
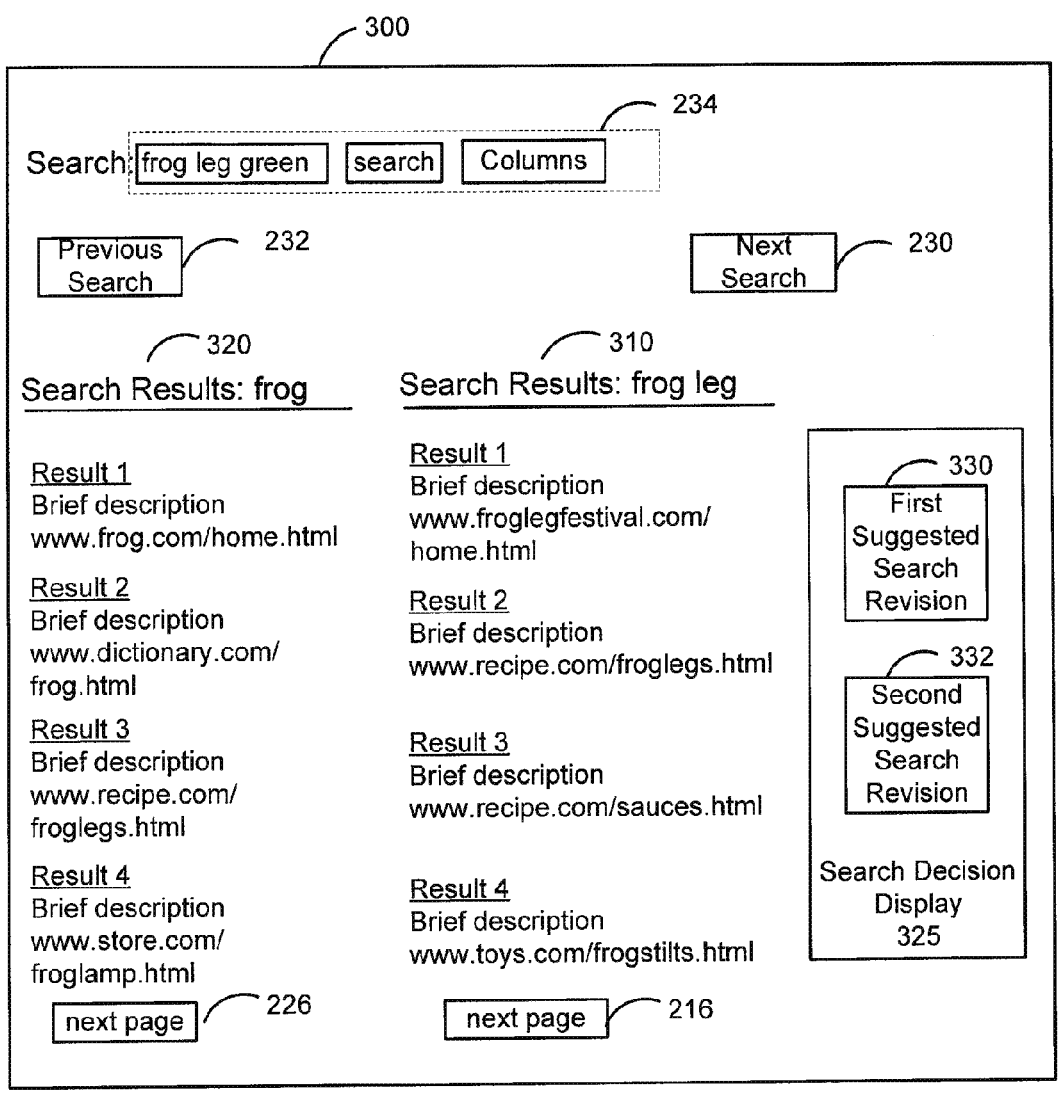
FIG. 3A is a web page illustrating a first search result listing for the search term "frog legs" and a second search result listing for the search term "frog" including a search decision display, according to an exemplary embodiment.

According to the exemplary embodiment shown in FIG. 3A, search revision selection display 325 includes a plurality of suggested revisions that may be selected by user 105. Selection of a suggested search revision by user 105 will initiate a new search by search engine 110 using the suggested revision search terms. Thereafter, each search revision may also include a listing of search results associated with the suggested search terms.

Search revision selection display 325 includes a first suggested search revision 330 to initiate a search using the search term "fried frog legs" and a second suggested search revision listing 332 to initiate a search using the search term "frog leg festivals." The suggested search revisions may be generated by search history presentation engine 120. The suggested search revisions may be generated based on any number of factors including, but not limited to, characteristics of the first search result listing 310, characteristics of the entire search results history of user 105, aggregated characteristics for a plurality of users 105 that have performed similar searches, aggregated information about the search terms used to generate the first search result listing 310, etc. A suggested search revision may be a revision to the search terms used to generate the first search result listing. Alternatively, a suggested search revision may be any search term that may be of interest based on at least the first search result listing, described in further detail below with reference to FIG. 5. Although two suggested search revisions are shown and described with reference to FIG. 3A, it should be understood that web page 300 may be configured to include any number of suggested search revisions.

Figure 3B:
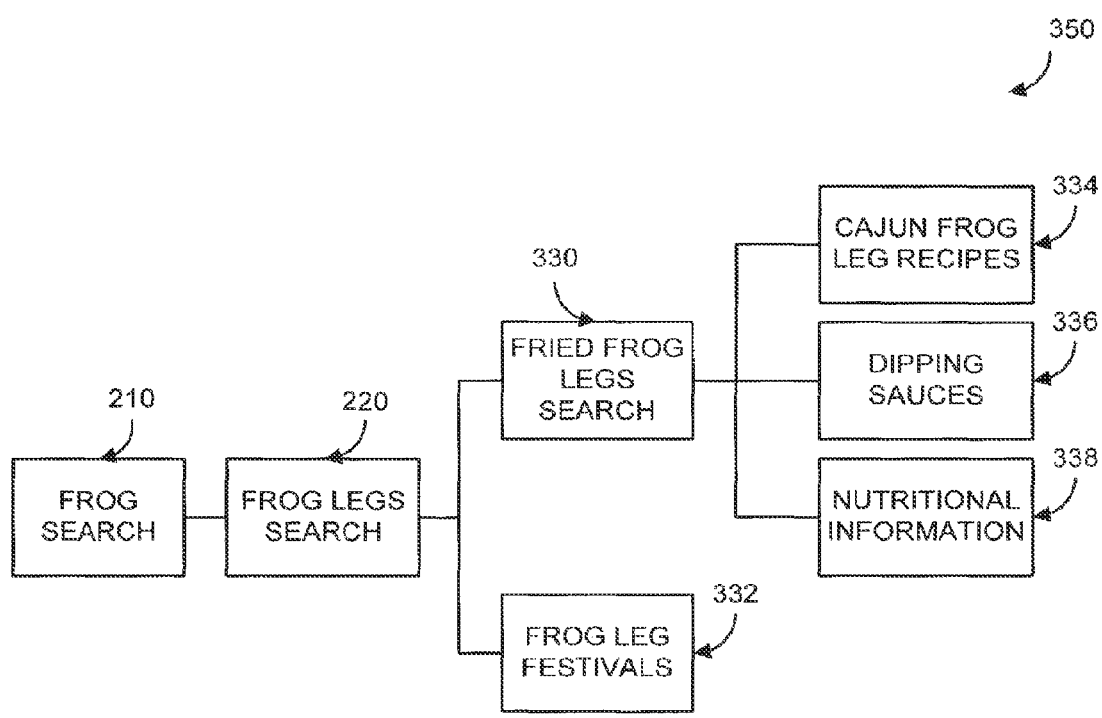
FIG. 3B is a search history tree where each branch of the search tree is representative of a searching decision made by user, according to an exemplary embodiment.

Referring now to FIG. 3B, a graphical representation of a search history tree 350 is shown where each branch of search tree 350 includes a suggest search revision node representative of a searching decision made by user 105, e.g., selection of one of multiple suggested search revisions in search decision display 325, according to an exemplary embodiment. Each suggested search revision is associated with a suggested search revision node 352a-d on search tree 350. A suggested search revision node may be a search node including search terms that have been suggested but not yet searched using search engine 110.

According to an exemplary embodiment, a user 105 using a web page 300 that offers multiple search suggested search revisions may build search history tree 350 based on their selection of suggested search terms in search revision selection display 325. Each suggested search revision selection may initiate generation of additional suggested search revisions by engine 120. Accordingly, search tree 350 may be updated to include newly generated suggested search revision nodes 354a-c based on selection of a suggested search revision in search revision selection display 325. The newly created suggested search revision nodes 354a-c are associated with the original suggested search revision node 352a-d such that the newly created suggested search revisions nodes 354a-c are "branches" from the original suggested search revision node 352a-d.

For example, as shown in FIG. 3B, a user 105 having entered the search term "frog legs" may be presented with web page 300 including suggested search revisions 330 and 332 to perform an additional search on either "fried frog legs" or "frog leg festivals", respectively. Where user 105 selected suggested search revision 330 at selection display 325, search history presentation engine 120 may be configured to generate a web page displaying the search results for "fried frog legs" as well as newly created suggested search revision nodes 354a-c including an additional suggested search revision 336 to search on the term "Cajun frog leg recipes," an additional suggested search revision 336 to search on the term "frog leg dipping sauces," and an additional suggested search revision 334 to search on the term "fried frog leg nutritional information."

Branches within search tree 350 may also be created by search revisions by user 105. For example, user 105 may be inspired by the suggested search revision to enter their own new search terms. These search terms may be related to the original search terms such that presentation engine can recognize the relationship based on the search terms. For example, referring to FIG. 3C, a user viewing the search results of the "fried frog legs" search maybe inspired to enter the search terms "French frog leg recipes." Presentation engine 122 may be configured to implement a simple pattern matching algorithm to recognize the correlation. Presentation engine 122 may also include more complex pattern matching algorithms to build search trees 350. Accordingly, a "French frog leg recipe" search node would be created and assigned as a branch from the "fried frog legs" search node.

Figure 3C:
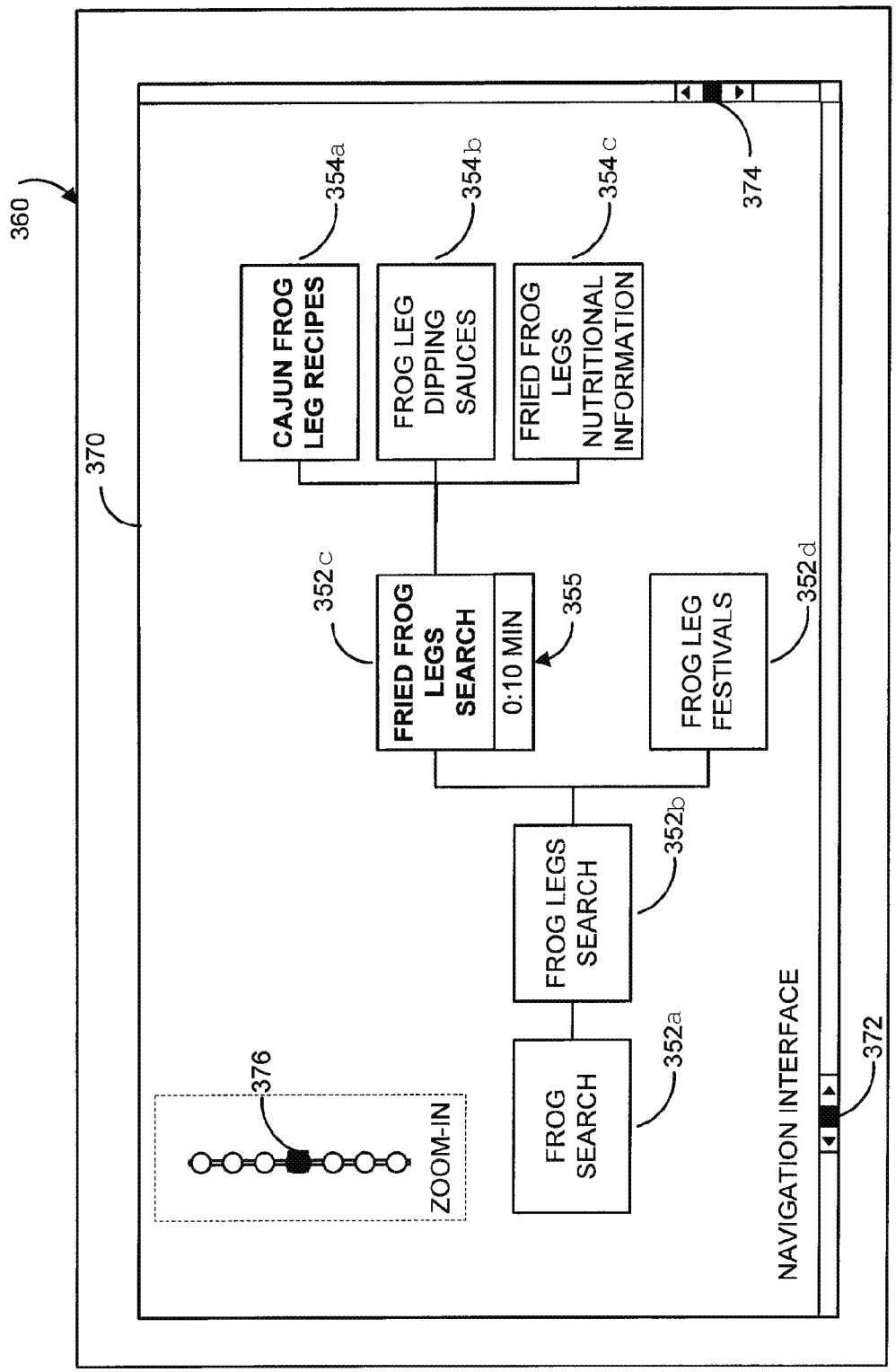
FIG. 3C is a web page displaying a search history tree including a search history navigation interface, according to an exemplary embodiment.

The graphical representation of a search history tree 350 maybe displayed to user 105 on a web page including listings of search results, similar to the web page shown and described above with reference to FIG. 2C. Alternatively, the graphical representation of a search history tree 350 may be displayed on a dedicated search history navigation web page. Referring now to FIG. 3C, a web page 360 displaying a search history tree 350 including a search history navigation interface 370 is shown, according to an exemplary embodiment.

Navigation interface 370 includes a timeline navigation interface 372, shown as a horizontal scroll bar, a search history selection interface 374, shown as a vertical scroll bar, and a zoom level interface 376. Advantageously, user 105 can utilize interfaces 372, 374 and 376 to view particular areas within search tree 350 in varying levels of detail. For example, a user may utilize zoom level interface 376 to "zoom in" on a particular suggested search revision node 352a-d to display the search terms for that search node at a first zoom level, the search terms and a first search results at a second zoom level, the search terms and a first ten search results including an indication of any prior selections of particular search results at a third zoom level, etc.

Search history presentation engine 120 may further be configured to display user search history behavior indicia on tree 350. For example, where user 105 has selected "fried frog legs" revision 330, and "Cajun frog leg recipes" revision 334, as shown in FIG. 3C, engine 122 may display search history tree 350 indicating suggested search history revisions that were selected by user 105 in bold text. Further, engine 122 may display a viewing time indication 355 associated with each search history listing to illustrate the amount of time that user 105 spent browsing through and clicking on links associated with various search results. Search tree 350 is configured to display the search results associated with each search term listing, tree 350 may further indicate which search results were actually selected by the user 105, the amount of time spent reviewing the web page associated with the search result, the number of times that the user has visited that particular site, etc.

Figure 4:
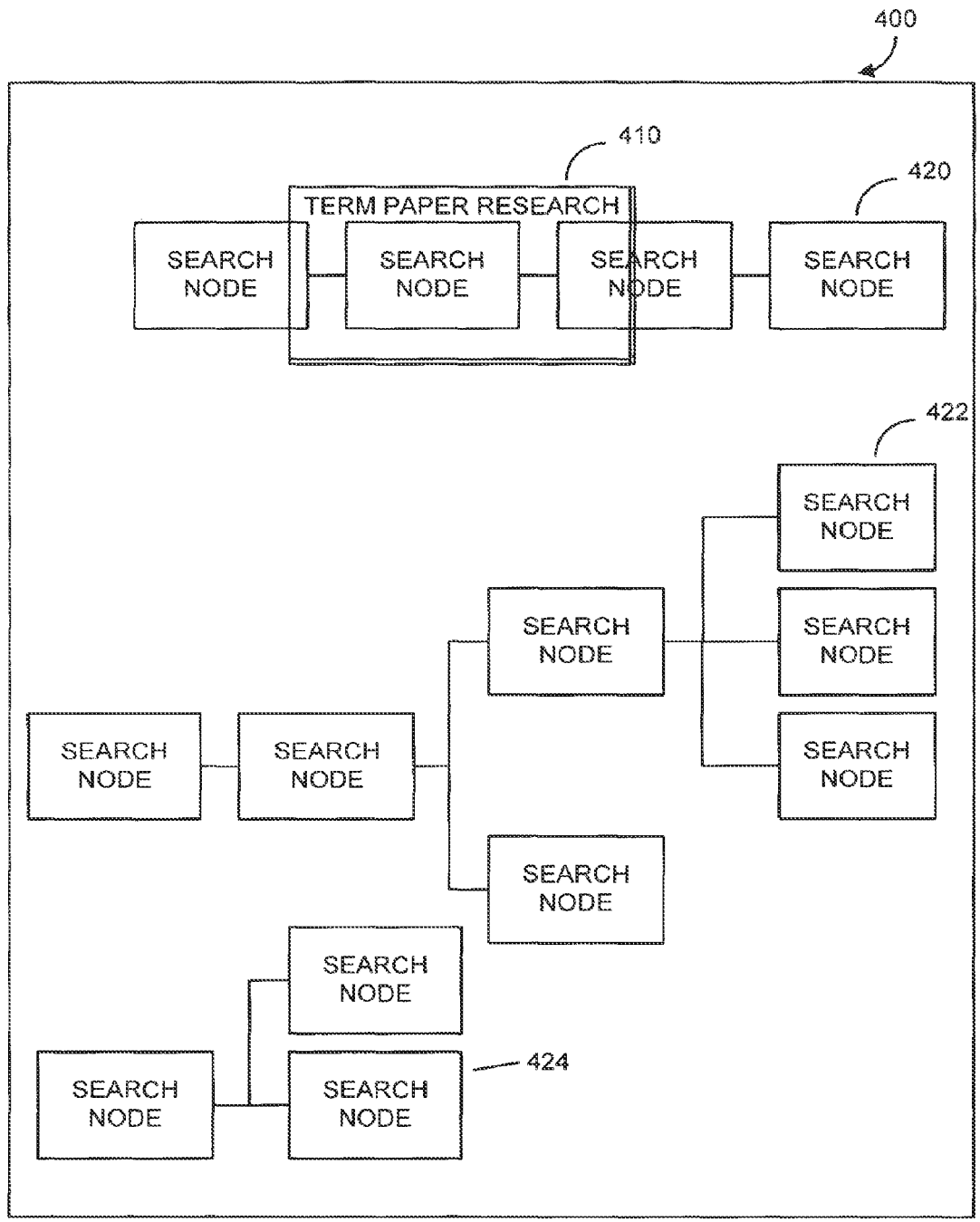
FIG. 4 is a virtual search history space including a plurality of searches performed by a user where the searches are grouped according to a search category, according to an exemplary embodiment.

Referring now to FIG. 4, a virtual search history space 400 including a plurality of searches performed by a user 105 where the searches are grouped according to a search category is shown, according to an exemplary embodiment. Search history space 400 is an abstraction representative of information stored in database 124 associated with a user 105. Search history space 400 includes a search history space browser window 410 representing a web page displayed to a user 105 to allow the user to views the searches in search history space 400.

Search history browser window 410 includes a zoom level selector allow the user to view more or less of the search history space 400. Search history browser window 410 may be configured such that zooming out allow users 105 to view more of search history space 400 with less detail, while zooming in provide further details regarding a smaller portion of search history space 400. Search history browser window 410 may further include a horizontal scroll bar allowing the user to move along a, search timeline and a vertical scroll bar configured to all the user to switch between search history categories. Search history browser window 410 may yet further include a search history title displayed to user 105 based on the search category currently being viewed.

The searches within search history space 400 may be organized and grouped in search history space 400 based on a search history category. For example, a first search history grouping 420 may be associated with searches related to ancient Rome, a second search history grouping 422 may be associated with frog legs, and a third search history grouping 424 may be associated with movies. Each search history grouping includes a plurality of search nodes. Each search node may include particular search terms, a listing of search results, indicia of user activity related to the search terms or search results, suggested search revisions, etc.

Search history categories may be selectable by user 105 or may be automatically generated. For example, a user 105 may select or define a search history category such as "term paper research" in addition to entering search terms related to ancient Rome for a search that will be associated with search history grouping 420. The search history category may be displayed to user, 105 with search history space 400. Alternatively, search history presentation engine 120 may be configured to include a search term-search category association engine that will associate search with categories based on any number of factors such as the search terns themselves, previously entered search terms, the search history of the user, previously selected search results, etc.

Figure 5:
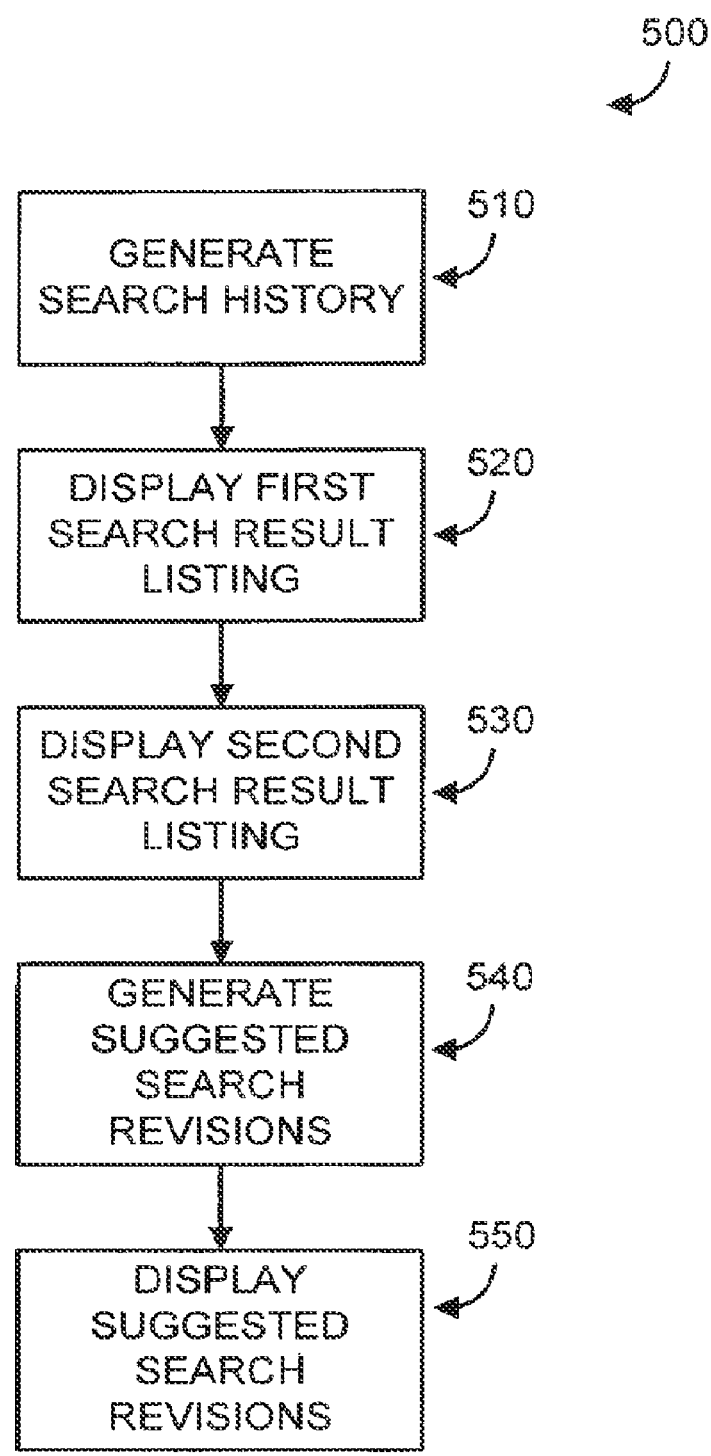
FIG. 5 is a flowchart illustrating a method for generating a web page configured to display a subset of a search history for a user and at least one suggested search revision, according to an exemplary embodiment.

Referring now to FIG. 5, a flowchart illustrating a method 500 for generating a web page 300 configured to display a subset of a search history for a user 105 and at least one suggested search revision is shown, according to an exemplary embodiment. Method 500 may be performed by search history presentation engine 120 in conjunction with search engine 110.

In a step 510, engine 120 generates a search history for a user 105 based on the users entry of one or more search term in the input field provided by search engine 110. The search engine 110 includes a plurality of search result listings and information associated with each search result listing. The information may include, but is not limited to, the search terms used to create the search result listing, any relationship between the search terms or the search result listing and other search terms and/or search result listings, the time spent by the user 105 viewing the search result listing, the search results selected by the user 105, suggested search revisions displayed to user 105 for the search result listing, etc.

Each search result listing stored in database 124 may be either static or dynamic. A static search result listing will have a complete record of the search result listing that was displayed to user 105 at the time the search was performed, independent of any subsequent changes to search results that may have occurred since the search was performed. A dynamic search result listing may be configured to be updated based on any changes that occur in the search results, the popularity of the search results, etc. A dynamic search result listing may be updated based on selection of the search result listing by user 105. Updating the dynamic search result listing may include re-running the search through search engine 110 using the search term(s) associated with the dynamic search result listing.

In a step 520, search history presentation engine 120 displays a first search result listing on a web page. The search result listing may be displayed based on entry of new search terms by user 105 in search engine 110, based on selection of a second search result listing stored in a search history and displayed in a search history timeline, based on actuation of a "forward" or "back" button on a search history browsing web page, etc. The search result listing may be configured to include a title displaying the search terms used to generate the search result listing, a listing of search results, a "next" button configured to allow user 105 to view additional search results within the same listing, etc.

In a step 530, search history presentation engine 120 displays at least a second search result listing on the same web page used to display the first search result listing where the at least second search result listing has some relationship with the first search result listing. The relationship may be based on timing, subject matter, a user-defined category, or any other criteria.

In a step 540, search history presentation engine 120 generates one or more suggested search revisions based at least in part on the first search result listing. The suggested search revisions may be based on one or more additional factors such as the user's aggregated search history, the search terms used to generate the first search result listing, behavior of other users that also provided the search terms used to generate the first search result listing, behavior of a group of users associated with the user 105, etc.

In a step 550, the suggested search revisions generated in step 540 are displayed to user 105 on the web page displaying the first search result listing such that the user may select a suggested search revision. Selection of a suggested search revision by user 105 will initiate a new search based on the suggested search revision using search engine 110. The search results generated based on the new search may be displayed as a first search result listing and the current search result listing may be displayed as a second search result listing.

Here and throughout, terms such as "user," "publisher," "visitor," and so forth are to be understood in the broadest possible sense. Herein, the term "user" is used generically to refer to consumers, advertisers, publishers, and visitors. By way of illustration and not of limitation, a "publisher" is not restricted to persons or entities who purport to be in the on-line publishing business (or any other kind of publishing business); nor to entities who have complete or even primary control over the content of particular websites; but rather is used in a more general sense. In the context of Internet-based advertising, for example, "publisher" includes any person or entity responsible directly or indirectly for putting content on the Internet, whether by hosting or sponsoring websites, posting pages, frames, graphics, applets, blogs, audiovisual content, etc., on their own or others' websites, providing web services that can source content for websites, or in any other manner. Still further, a "visitor" may be an individual who visits and views or otherwise perceives the content of a web site and pages therein via a web browser or other client software program running on a personal computer, wireless handheld device, or the like, but may also be, for example, a corporate or other entity whose servers access published web content and advertisements by invoking web services through appropriate application programming interfaces (APIs); a "visitor" may or may not be the intended or actual end user of a product or service that is the subject of an advertisement, etc. A visitor may also be an automated system, such as a web crawler associated with a search engine. In sum, persons of skill in the art will appreciate that a wide variety of actors, more than can be conveniently set forth here, can play the roles of "advertiser," "publisher," and "visitor" for purposes of the present invention. It will be further appreciated that the selfsame person or entity may be both "publisher" and "advertiser," or both "publisher" and "visitor," or both "advertiser" and "visitor", or even all three, depending on the context. In a similar vein, and as will be apparent from the foregoing, terms such as "web page," "website," and so forth are used to give specific illustrative examples of settings in which on-line content and advertisements can be presented to and perceived by users. Such examples are not intended to be limiting, and persons of skill in the art will appreciate that many other such settings now known or yet to be developed may be suitable to the practice of the present invention in specific embodiments.

It should be noted that although flowcharts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule-based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing, environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method for displaying a search history for a user, comprising:
    under control of one or more computer systems configured with executable instructions, generating:
        a first search history grouping comprising at least one first search result listing associated with a first subject matter;
        a second search history grouping comprising at least one second search result listing associated with a second subject matter different from the first subject matter; and
    configuring display information that includes specifications for concurrently displaying, at least:
        a first search history representation corresponding to the first search history grouping, the first search history representation including a plurality of first search nodes each representative of a corresponding first search result listing, the plurality of first search nodes being arranged chronologically according to when respective searches corresponding to the first search result listings were submitted by the user; and
        a second search history representation corresponding to the second search history grouping, the second search history representation including a plurality of second search nodes each representative of a corresponding second search result listing, and the plurality of second search nodes being arranged chronologically according to when respective searches corresponding to the second search result listings were submitted by the user;
        the first and the second search history representations including a respective timeline and being configured to allow user navigation among the first and the second search listings represented by the first and the second search history representations;
        an indication associated with one of a first search node and a second search node, the indication identifying a position corresponding to the first search node or the second search node along the respective timeline;
        one or more search revisions, each revisions being associated with one of the first and the second search history representations and being selectable to obtain for display search results corresponding to the suggested search revisions; and
    providing the configured display information for display to the user.

2. The computer-implemented method of claim 1, wherein the configured display information is encoded in at least one document of a web page.

3. The computer-implemented method of claim 1, wherein at least one of the first search history representation or the second search history further representation further includes a search history tree.

4. The computer-implemented method of claim 3, further including providing for display search history behavior indicia on the search history tree.

5. The computer-implemented method of claim 1, further comprising:
    generating a third search result listing at a third time after the first time and the second time, the third search result listing being associated with one of the first subject matter or the second subject matter but not the other,
    updating one of the first search history grouping or the second search history grouping to include a third search node representing the third search result listing based on an association of the third search result with one of the first subject matter or the second subject matter.

6. A computer-readable storage medium having stored thereon instructions that, when executed by one or more processors of a computer system, cause the computer system to at least:
    generate:
        a first search history grouping comprising at least one first search results listing associated with a first subject matter;
        a second search history grouping comprising at least one second search results listing associated with a second subject matter different from the first subject matter; and
    configure one or more documents to collectively include, at least:
        a first search history representation corresponding to the first search history grouping, the first search history representation including a plurality of first search nodes each representative of a corresponding first search result listing, the plurality of first search nodes being arranged chronologically according to when respective searches corresponding to the first search result listings were submitted by a user;
        a second search history representations corresponding to the second search history grouping, the second search history representation including a plurality of second search nodes each representative of a corresponding second search result listing, and the plurality of second search nodes being arranged chronologically according to when respective searches corresponding to the second search result listings were submitted by the user;

the first and the second search history representations including a respective timeline and being configured to allow user navigation among the first and the second search listings represented by the first and the second search history representations;

an indication associated with one of a first search node and a second search node, the indication identifying a position corresponding to the first search node or the second search node along the respective timeline;

one or more search revisions, each revisions being associated with one of the first and the second search history representations and being selectable to obtain for display search results corresponding to the suggested search revisions; and provide the configured one or more documents for display to the user to enable the user to simultaneously display the first search result listing, the second search result listing, and the search history representation.

7. The computer-readable storage medium of claim 6, wherein the configured one or more documents correspond to a web page.

8. The computer-readable storage medium of claim 6, wherein at least one of the first search history representation or the second search history representation further includes a search history tree.

9. The computer-readable storage medium of claim 6 having further instructions that, when executed by one or more processors of a computer system, cause the computer system to at least: generate a third search result listing at a third time after the first time and the second time, the third search result listing being associated with one of the first subject matter or the second subject matter but not the other, update one of the first search history grouping or the second search history grouping to include history a third search node representing the third search result listing.

10. A computer system for configuring display information, comprising:

one or more processors; and memory including executable instructions that, when executed collectively by the one or more processors, cause the computer system to at least:

generate:

a first search history grouping comprising at least one first search results listing associated with a first subject matter;

a second search history grouping comprising at least one second search result listing associated with a second subject matter different from the first subject matter;

configure, based at least on the at least one search results listing and the at least one second search results listing, display information that includes specifications for concurrently displaying, at least:

a first search history representation corresponding to the first search history grouping, the first search history representation including a plurality of first search nodes each representative of a corresponding first search result listing, the plurality of first search nodes being arranged chronologically according to when respective searches corresponding to the first search results listings were submitted by a user;

a second search history representations corresponding to the second search history grouping, the second search history representation including a plurality of second search nodes each representative of a corresponding second search result listing, and the plurality of second search nodes being arranged chronologically according to when respective searches corresponding to the second search result listings were submitted by the user;

the first and the second search history representations including a respective timeline and being configured to allow user navigation among the first and the second search listings represented by the first and the second search history representations;

an indication associated with one of a first search node and a second search node, the indication identifying a position corresponding to the first search node or the second search node along the respective timeline;

one or more search revisions, each revisions being associated with one of the first and the second search history representations and being selectable to obtain for display search results corresponding to the suggested search revisions; and provide the configured display information for display to the user.

11. The computer system of claim 10, wherein the configured display information is encoded in at least one document of a web page.

12. The computer system of claim 10, wherein at least one of the first search history representation or the second search history representation further includes a search history tree.

13. The computer system of claim 10, wherein the display information further includes specifications for:

generating a third search result listing at a third time after the first time and the second time, the third search result listing being associated with one of the first subject matter and the second subject matter but not the other, updating one of the first search history grouping or the second search history grouping to include a third search node representing the third search result listing.

* * * * *